US012803651B2

(12) United States Patent
Hormis et al.

(10) Patent No.: US 12,803,651 B2

(45) Date of Patent: Nov. 17, 2026

(54) BEAMFORMING REPEATER WITH META-SURFACE ANTENNAS

(71) Applicant: QUALCOMM Incorporated, San Diego, CA (US)

(72) Inventors: Raju Hormis, New York, NY (US); Junyi Li, Fairless Hills, PA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 740 days.

(21) Appl. No.: 17/721,979

(22) Filed: Apr. 15, 2022

(65) Prior Publication Data

US 2023/0336237 A1 Oct. 19, 2023

(51) Int. Cl.

| | |
|---|---|
| ***H04B 7/155*** | (2006.01) |
| ***H01Q 21/06*** | (2006.01) |
| ***H04B 7/06*** | (2006.01) |
| ***H04B 7/08*** | (2006.01) |

(52) U.S. Cl.

CPC ....... *H04B 7/15535* (2013.01); *H01Q 21/061* (2013.01); *H04B 7/0617* (2013.01); *H04B 7/08* (2013.01)

(58) Field of Classification Search

CPC .... H04B 7/14; H04B 7/15535; H04B 7/1555; H04B 7/15564; H04B 7/15578; H04B 7/06; H04B 7/0602; H04B 7/0617; H04B 7/08; H04B 7/0802; H01Q 21/06; H01Q 21/061

See application file for complete search history.

(56) References Cited

U.S. PATENT DOCUMENTS

| | | | | |
|---|---|---|---|---|
| 8,175,521 | B2 * | 5/2012 | O'Neill | H04B 7/15535 455/7 |
| 10,608,678 | B1 * | 3/2020 | Hormis | H04B 1/0458 |
| 10,931,004 | B2 * | 2/2021 | Yoo | H04B 7/0413 |
| 11,177,872 | B1 * | 11/2021 | Rofougaran | H04B 7/15507 |
| 11,190,266 | B1 * | 11/2021 | Black | H04W 12/08 |
| 2004/0097189 | A1 * | 5/2004 | Bongfeldt | H04W 52/10 455/7 |

(Continued)

FOREIGN PATENT DOCUMENTS

| | | | | | |
|---|---|---|---|---|---|
| CN | 112335188 | A | * | 2/2021 | G01S 19/01 |
| CN | 113904119 | A | * | 1/2022 | H01Q 1/38 |
| GB | 2428538 | A | * | 1/2007 | H04B 7/1555 |

OTHER PUBLICATIONS

Xu et al., "Miniaturized SIW cavity-backed slot antenna based on metasurface units", CN113904119A, English Machine Translation, Jan. 7, 2022. (Year: 2022).*

(Continued)

*Primary Examiner* — Quochien B Vuong

(74) *Attorney, Agent, or Firm* — QUALCOMM Incorporated

(57) ABSTRACT

A wireless repeater receives an RF signal at a first meta-surface antenna. A signal relay chain amplifies a received RF signal from the first meta-surface antenna into a transmit RF signal that is transmitted by a second meta-surface antenna. Alternatively, the signal relay chain receives the RF signal at a reception port of the first meta-surface antenna, which may include a transmit port for receiving the transmit RF signal.

30 Claims, 11 Drawing Sheets

(56) References Cited

U.S. PATENT DOCUMENTS

| | | | | |
|---|---|---|---|---|
| 2005/0208907 | A1 * | 9/2005 | Yamazaki | H04B 1/0483 455/126 |
| 2019/0067826 | A1 * | 2/2019 | Achour | H01Q 21/065 |
| 2021/0175630 | A1 * | 6/2021 | Boyarsky | H01Q 21/08 |
| 2021/0176648 | A1 * | 6/2021 | Labadie | H04W 16/20 |
| 2021/0203079 | A1 * | 7/2021 | Sazegar | H01Q 5/55 |

OTHER PUBLICATIONS

Rochberger et al., “Method And Apparatus For Wireless Communication in a Device-to-device Network”, CN 112335188A, English Text, Feb. 5, 2021. (Year: 2021).*

* cited by examiner

BEAMFORMING REPEATER WITH META-SURFACE ANTENNAS

FIELD OF TECHNOLOGY

The present disclosure relates generally to wireless communications and more specifically to a beamforming repeater with meta-surface antennas.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some deployments, wireless communications systems may implement wireless repeaters for repeating and extending signals received from, for example, base stations to UEs and from UEs to base stations. Some wireless repeaters support beamforming for directional communications, which may improve channel capacity and signal immunity to interference. In some cases, wireless repeaters suffer from radiation leakage, in which transmission signals from the repeater "leak" back to the reception path, which may cause instability in the repeater and affect signal quality. Further, some wireless repeaters suffer from increased complexity and power consumption in order to include a combination of phase shifters and amplifiers for each radiation element for implementing beamforming in applications with size, power, and cost constraints such as densified small cells.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with an aspect of the disclosure, an apparatus for wireless communication is provided that includes: a first meta-surface antenna configured to receive a signal via a receive antenna beam; a second meta-surface antenna configured to retransmit the signal via a transmit antenna beam; and a signal relay chain connected to route and amplify the signal between a reception at the first meta-surface antenna and a retransmission at the second meta-surface antenna.

In accordance with another aspect of the disclosure, an apparatus for wireless communication is provided that includes: a dual-port meta-surface antenna with a reception port and a transmission port; and a signal relay chain with an input coupled to the reception port and an output coupled to the transmission port, wherein the signal relay chain is operable to retransmit a signal received from the reception port to the transmission port.

In accordance with yet another aspect of the disclosure, a method for wireless communication is provided that includes: receiving a signal via a receive antenna beam of a first meta-surface antenna; retransmitting the signal via a transmit antenna beam of a second meta-surface antenna; and adjusting, via a beam controller, a direction of at least one of the receive antenna beam and the transmit beam.

Finally, in accordance with another aspect of the disclosure, an apparatus for wireless communication is provided that includes: means for receiving, at a first meta-surface antenna of a wireless repeater, a signal via directional beamforming; means for retransmitting the signal via directional beamforming at a second meta-surface antenna of the wireless repeater; and means for adjusting, via a beam controller, at least one of the directional beamforming for receiving the signal or retransmitting the signal in order to reduce signal interference caused by the retransmitting.

Other aspects, features, and implementations of the present disclosure will become apparent to those of ordinary skill in the art, upon reviewing the following description of specific, exemplary implementations of the present disclosure in conjunction with the accompanying figures. While features of the present disclosure may be discussed relative to certain implementations and figures below, all implementations of the present disclosure can include one or more of the advantageous features discussed herein. In other words, while one or more implementations may be discussed as having certain advantageous features, one or more of such features may also be used in accordance with the various implementations of the disclosure discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various implementations and to explain various principles and advantages in accordance with the present disclosure.

DETAILED DESCRIPTION

Figure 1:
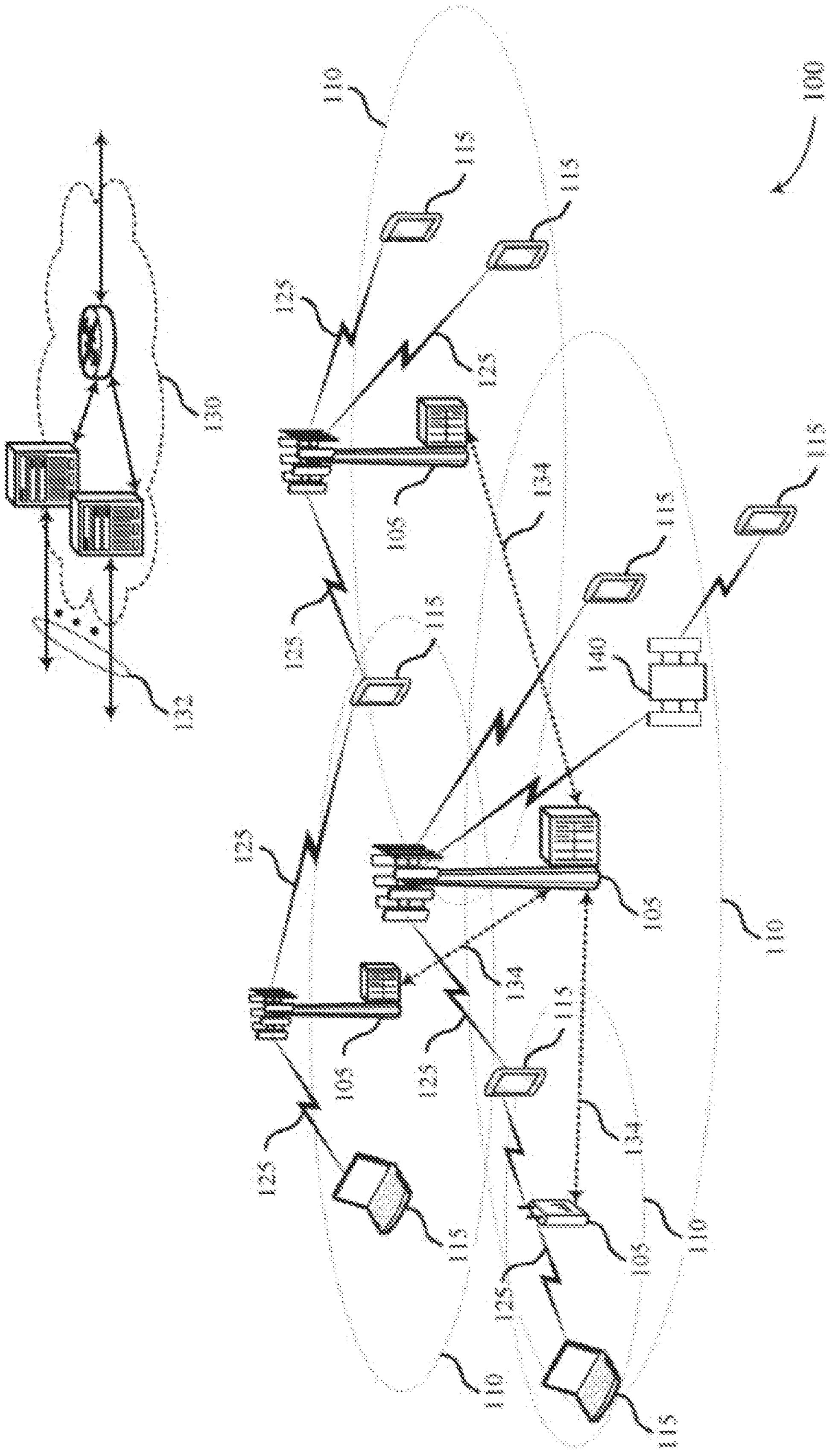
FIG. 1 illustrates an example of a system for wireless communication that supports a beamforming repeater in accordance with aspects of the present disclosure.

Although 5G NR offers increased flexibility and bandwidth through the use of higher-frequency bands such as the FR2 band, signaling at these higher frequencies is subjected to a number of unfavorable properties such as increased propagation path loss and RF shadowing effects as compared to traditional cellular communication in lower frequency bands. Whereas a service provider may utilize a relatively sparse base station distribution for a traditional lower-frequency cellular network, the number of base stations to cover the same area using millimeter-wave frequencies must be substantially increased. The increased base station density increases costs. For example, in addition to the cost of the base station itself, the service provider must typically rent the real estate for the housing of the base station. The resulting costs have hampered the implementation of higher-frequency networks.

To reduce costs despite the use of higher-frequency bands, the downlink signals from the base station and uplink signals to the base station may be repeated in various RF repeaters. An RF repeater functions to receive and amplify an RF signal before retransmitting the RF signal. In this fashion, the range of both the downlink (DL) and uplink (UL) signals is extended. To lower costs, an RF repeater may function purely in the RF domain such that no frequency translation of the RF signal occurs. Such an RF repeater thus needs no mixers to translate the RF signal since the RF signal is never converted to baseband. Since there is no baseband conversion, the RF repeater needs no phase-locked loops to generate a local oscillator signal nor does the RF repeater need any analog-to-digital converters to convert the (non-existent) baseband signal from the analog domain to the digital domain. An RF repeater also does not need a digital core to process the (non-existent) digital baseband signal. It may thus be seen that an RF repeater may be substantially less complex and costly as compared to a base station. By surrounding a high-frequency base station with appropriately-located RF repeaters, a resulting cell size may be comparable to a traditional lower-frequency cell size. As a result, the high-frequency base station density does not need to be substantially increased as compared to the traditional lower-frequency base station density, which lowers costs for the service provider and encourages the roll-out and implementation of higher-frequency networks.

Although RF repeaters are thus advantageous, a traditional RF repeater uses a phased-array architecture for both its receiver and transmitter as will be discussed further herein. For example, an array of receive antennas may be associated with an array of low-noise amplifiers such that each low-noise amplifier amplifies a received signal from a corresponding receive antenna. The array of low-noise amplifiers is associated with an array of receiver phase-shifters such that each receiver phase-shifter phase-shifts an output signal from the corresponding low-noise amplifier. The various phase-shifted and amplified signals are combined to form a received signal. Depending upon the phase-shift applied by each receive phase-shifter, a receive antenna beam for the receive antenna array may be steered in a desired direction.

The transmitter then further amplifies and transmits the received signal. Analogous to the receiver, the transmitter may include an array of transmit antennas that are associated with an array of power amplifiers and an array of transmit phase-shifters. Each power amplifier amplifies the received signal. The corresponding transmit phase-shifter may then phase-shift the amplified signal from the associated power amplifier before driving the corresponding transmit antenna. Depending upon the phase-shift applied by each transmit phase-shifter, a transmit antenna beam from the transmit antenna array may be steered in a desired direction.

Such a phased-array topology consumes power due to the operation of the various receive phase-shifters, low-noise amplifiers, power amplifiers, and transmit phase-shifters. In addition, the use of so many components increases the RF repeater cost. To lower cost and complexity, an RF repeater is disclosed that uses a meta-surface antenna for reception and for transmission. In this fashion, a high-frequency network may finally be formed at a cost comparable to a traditional lower-frequency cellular network. The increased bandwidth and data rates of a millimeter-wave network may thus finally be realized in a practical, cost-effective fashion despite the relatively-unfavorable RF properties at higher frequencies.

To better appreciate the advantageous properties of the meta-surface antenna RF repeater, aspects of the disclosure are initially described in the context of a wireless communications system. Aspects of the disclosure are further described in the context of block diagrams of a wireless repeater, circuit diagrams of integrated circuits within the wireless repeater, and a process flow diagram. Aspects of the disclosure are further illustrated by and described with reference to apparatus diagrams, system diagrams, and flowcharts that relate to a beamforming repeater.

FIG. 1 illustrates an example of a wireless communications system 100 that supports a meta-surface RF repeater 140 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or New Radio (NR) network, or a fifth generation (5G) network. In some implementations, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, which may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously) instead of full-duplex communication. In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some implementations, a UE 115 may also be able to communicate directly with other UEs 115 (e.g., using a peer-to-peer (P2P) or device-to-device (D2D) protocol) such as a sidelink. One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, base station 105 or UE 115 may be equipped with multiple antenna elements, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antenna elements and the receiving device is equipped with one or more antenna elements. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antenna elements or different combinations of antenna elements. Likewise, the multiple signals may be received by the receiving device via different antenna elements or different combinations of antenna elements. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal relay technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements such that signals propagating at particular orientations experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

To address the relatively-poor RF propagation properties at higher frequencies such as the centimeter and millimeter wave bands, wireless communications system 100 may include one or more meta-surface RF repeaters 140. The RF repeaters 140 may extend the functionality of base stations 105 and/or UEs 115 by repeating, extending, and/or redirecting wireless signals. In some cases, an RF repeater 140 may be used in line of site (LOS) or non-line of sight (NLOS) scenarios. RF repeaters 140 may also be denoted herein as wireless repeaters 140. In a LOS scenario, higher-frequency transmissions may be limited by path-loss through air, which may be overcome using beamforming techniques at the wireless repeater 140. In a NLOS scenario, such as in an urban area or indoors, higher-frequency transmissions may be limited by signal blocking or signal interfering physical objects. A RF repeater 140 may be utilized to receive a signal from a base station 105 and transmit the signal to the UE 115 and/or receive a signal from a UE 115 and transmit the signal to the base station 105. Beamforming and gain control techniques may be utilized in RF repeater 140 to improve signal quality for the UE 115 and base station 105 by isolating signals (e.g., via beamforming) and improving or maintaining stability within a signal relay chain of the repeater (e.g., via gain control).

The wireless repeater 140 includes a beamforming reception (RX) meta-surface antenna and a beamforming transmission (TX) meta-surface antenna. In some implementations, the RX and TX meta-surface antennas are separate. In other implementation, the beamforming RX antenna and the beamforming TX antenna comprise the same meta-surface antenna. To address self-interference in a single meta-surface antenna implementation, the meta-surface antenna may be a dual-polarized antenna, wherein the dual-polarized antenna functions in a first polarization as the RX antenna and functions in a second polarization as the TX antennas. The repeater 140 may further include a beam control system, which may comprise a system on chip (SoC) for controlling the transmit and/or receive beam direction or steering to reduce signal interference caused by the retransmission.

In some cases, the wireless repeater 140 is an analog radio frequency (RF) repeater, and the wireless repeater 140 may include a signal relay chain connected (e.g., coupled, linked, attached) between the beamforming RX antenna and the beamforming TX antenna. The signal relay chain may be implemented as an RFIC, which may include RF/microwave components such as a low-noise amplifiers (LNA), a power amplifiers (PA), a PA driver, gain controllers, or other circuitry. Each meta-surface antenna may be a beamsteering antenna that is responsive to a beamsteering command signal. Based upon the beamsteering command signal, the meta-surface antenna steers its antenna beam accordingly. In this fashion, wireless repeater 140 does not need any analog phase-shifters, thereby saving power and reducing complexity. The signal relay chain may include a feedback path for monitoring the output of one or more PAs, and adjusting gains to one or more PA drivers to the PAs and gains to one or more LNAs based on the output. The gain adjustment may function to stabilize the signal reception and transmission and improve signal quality between devices such as base station 105 and UE 115. Accordingly, through beamforming and gain control, signal quality (e.g., mmW signals) may be improved in LOS and NLOS scenarios.

As described, the wireless repeater 140 may include components (e.g., beamforming RX and TX antennas and signal relay chain circuitry) in the analog/RF domain. Accordingly, in some implementations, the wireless repeater 140 may be free of any mixers and digital components for various features described herein. However, in alternative implementations, the wireless repeater 140 may include frequency translations stages (e.g., mixers) and digital components. In some cases, the wireless repeater 140 may include side channel components for receiving beamforming configurations from a base station 105 or other device. Example side channels may be implemented as Bluetooth, ultra-wide band, wireless LAN, etc., and as such, the wireless repeater 140 may include circuitry and/or processors for receiving and/or processing signals received via those protocols and controlling beamforming at the RF/microwave components based on those signals received via the side channel. An example beamforming repeater will now be discussed in more detail.

Figure 2:
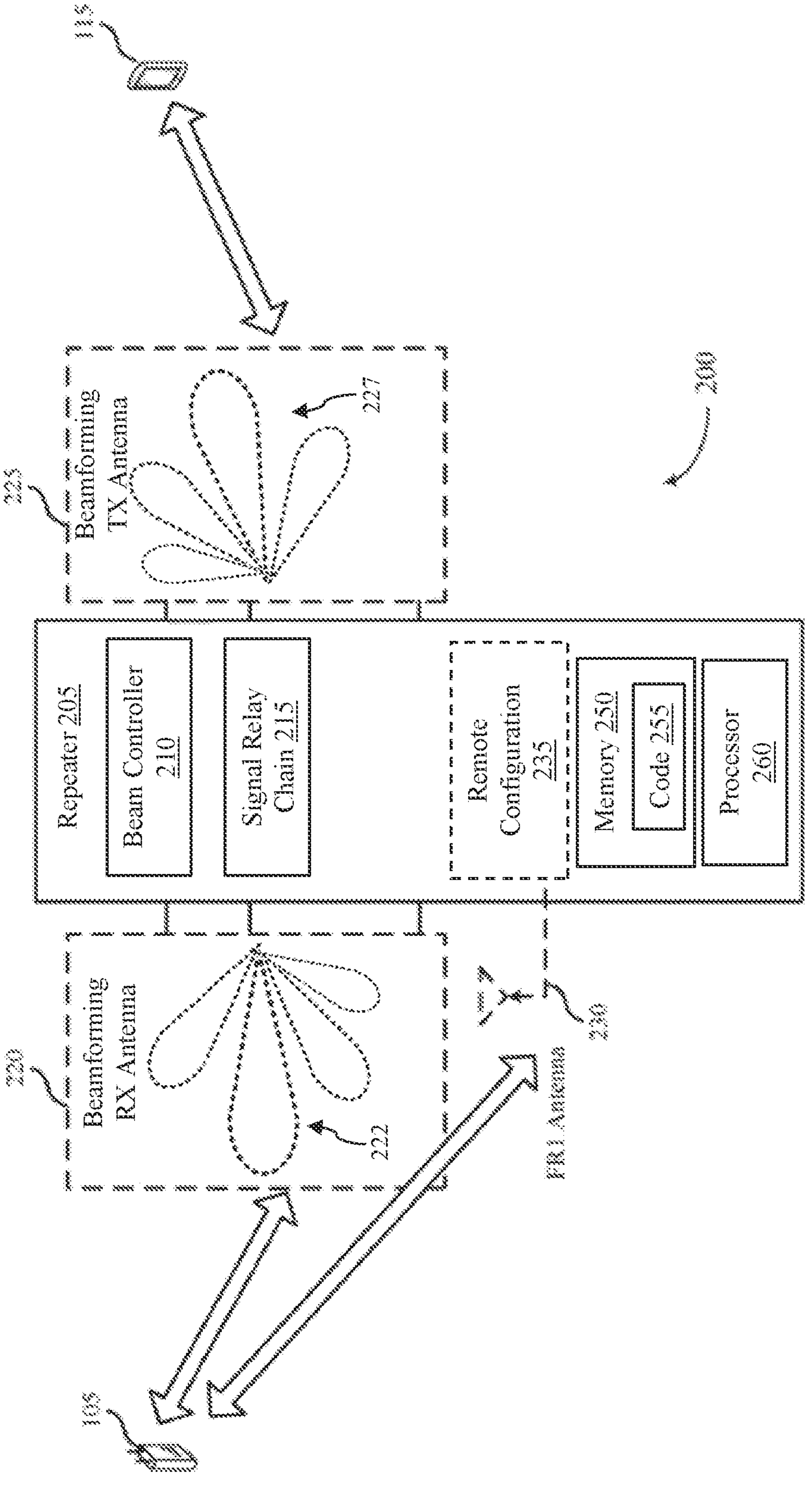
FIG. 2 illustrates an example of a block diagram of a beamforming repeater in accordance with aspects of the present disclosure.

FIG. 2 illustrates an example wireless communication system 200 including a beamforming repeater 205 in accordance with aspects of the present disclosure. Wireless communication system 200 may be considered to be a subset of wireless communication system 100. System 200 includes a base station 105 and a UE 115. However, it will be appreciated that repeater 205 may instead repeat signals between two UEs 115 such as in a sidelink network. The repeater 205 includes a beamforming RX meta-surface antenna 220 and a beamforming TX meta-surface antenna 220. Lobes (e.g., lobes 222 and 227) illustrate the effective spatial shape of the received and transmitted signal power after beamforming within the repeater 205. The main lobes in the lobes 222 and 227 are typically directed to a target reception signal, which may be transmitted by a base station 105 or a UE 115. RX antenna 220 thus has a main lobe directed to base station 105. This main lobe is also denoted herein as a receive antenna beam. Similarly, TX antenna 225 has a main lobe directed towards UE 115. This main lobe is also denoted herein as a transmit antenna beam. RX antenna 220 and TX antenna 225 may each include meta-material resonators arranged in an array within a dielectric substrate as known in the meta-surface antenna arts.

The repeater 205 may further include a beam controller 210 and a signal relay chain 215, which may include various circuitry including one or more PAs and LNAs. The signal relay chain 215 may include various analog/RF domain components and may be implemented as a RFIC (e.g., MMIC). The repeater 205 may also include a memory 250 (which may include computer executable code 255) and a processor 260. Beam controller 210 may thus be implemented by processor 260 in some implementations such that beam controller 210 is shown separately for illustration purposes. In alternative implementations, processor 260 may be distinct from beam controller 210 and control the operations of beam controller 210.

Beam controller 210 (e.g., a beamformer) may control a beam direction and width of the receive antenna beam for beamforming RX antenna 220 and/or a beam direction and width of the transmit antenna beam for beamforming TX antenna 225 to improve or maintain isolation between the antenna beams. In some cases, the beam controller 210 controls beam direction to ensure target reception and/or transmission beams are sufficiently spread apart to avoid interference. Furthermore, the beam controller 210 may utilize antenna adjustments to adjust beam width, such as certain amplitude and phase offsets to signals carried via the antenna elements of the beamforming RX antenna 220 and the beamforming TX antenna 225.

In some implementations, beam controller 210 may be responsive to commands from base station 105. For example, the beam controller 210 may receive control information from a remote configuration component 235, which may communicate with base station 105 using non-beamformed communications and an antenna 230 that works at a lower frequency or at the same frequency. For example, the beamforming RX antenna 220 and the beamforming TX antenna 225 may use mmW frequencies (which may be referred to as frequency range 2 (FR2)), and the side control channel may be a separate low-band connection established using a lower frequency band (e.g., at less than 6 GHz, which may be referred to as sub-6 communications or frequency range 1 (FR1)). In one example, the side control channel is via a narrow band internet-of-things (NB-IoT) connection using FR1. Additionally (or alternatively) control information may be provided by base station 105 via a side channel implemented as a Bluetooth channel, ultra-wide band channel, a wireless LAN channel, etc. Accordingly, the repeater 205 may include circuitry for receiving and processing side channel communications to control the beam controller 210. The base station 105 may transmit beamforming control configurations based on operating environment, position of the UE 115, configuration of the UE 115, any detected jammers, or any combinations thereof.

Although described as RX and TX antennas, note that each meta-surface antenna 220 and 225 may be used as both a transmit and a receive antenna. Repeater 205 may receive signals from the base station 105 according to a first receive beamforming configuration and retransmit the signals to the UE 115 according to a first transmit beamforming configuration. The repeater 205 may further receive signals from the UE 115 according to a second receive beamforming configuration and retransmit the signals to the base station 105 according to a second transmit beamforming configuration. As such, the repeater 205 may function to implement uplink and downlink communications and may be utilized for communication in uplink or downlink scenarios.

Figure 3:
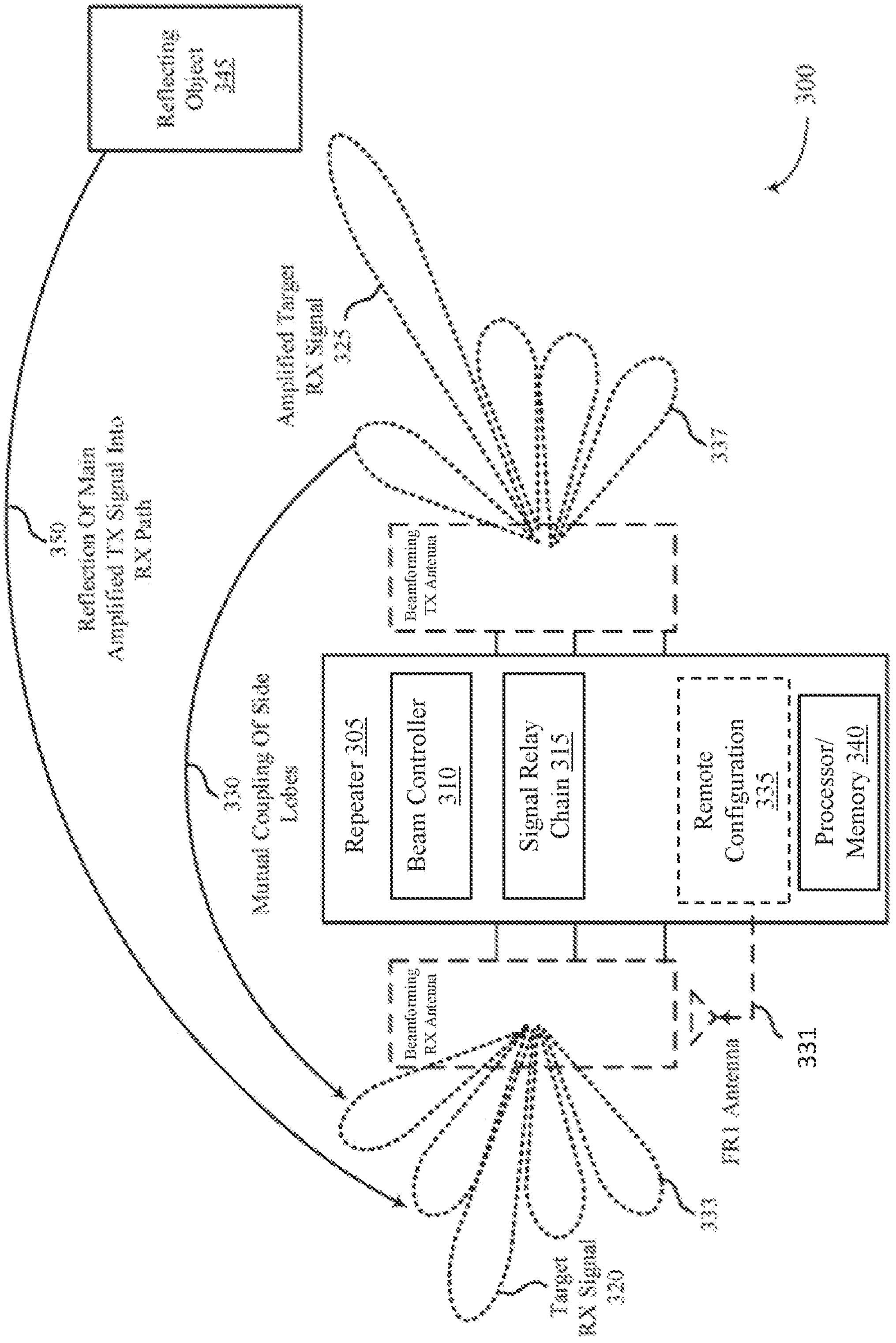
FIG. 3 illustrates an example of another block diagram of a beamforming repeater in accordance with aspects of the present disclosure.

FIG. 3 illustrates a wireless system 300 including a beamforming repeater 305 in accordance with aspects of the present disclosure. In some examples, the devices of FIG. 3 may implement aspects of wireless communications system 100. The repeater 305 may include a beamforming RX meta-surface antenna and a beamforming TX meta-surface antenna as described with respect to FIG. 2. The repeater 305 may beamform a received signal via various beam directions (or scan angles). Lobes (e.g., main lobe 320 and side lobes 333) of the RX antenna illustrate the effective spatial shape of the received signal power after beamforming within the RX antenna. The main lobe 320 is typically directed to a target reception signal, which may be transmitted by a UE or a base station. The target reception signal may correspond to the signal to be retransmitted to another device such as a UE or a base station. Lobes (e.g., main lobe 325 and side lobes 337) of the TX antenna illustrate the effective spatial shape of a transmitted signal power after beamforming within the TX antenna. A beam controller 310 may adjust the beam configuration of the RX antenna such that the RX antenna receives a higher quality target signal. The beam controller 310 may further adjust the beam configuration of the TX antenna such that the target device receives a higher quality signal. Repeater 305 includes a signal relay chain 315 that amplifies a received signal from the RX antenna before it is re-transmitted by the TX antenna for better reception or retransmission of the signal. The beam controller 310 may receive control information from a remote configuration component 335, which may communicate with a base station or a UE using non-beamformed communications and a lower frequency antenna 331. The repeater 305 may also include processor/memory 340, which may be used to control one or more of the beam controller 310 and the signal relay chain 315.

An arrow 330 represents possible signal reception and retransmission interference via mutual coupling (e.g., signal leakage) of side lobes of the respective beam configurations of the beamforming RX antenna and the beamforming TX antenna. In some cases, the beam controller 310 may adjust beam width, direction, or both to avoid the mutual coupling. Furthermore, in some cases the signal relay chain 315 may implement gain control techniques to improve stability and reduce interference in the repeater 305. An arrow 350 represents a reflection of an amplified signal from a reflecting object 345 back to the RX antenna, which may cause signal interference or leakage. The beam controller 310 may adjust beam width, antenna beam direction, or both to avoid interference via such a reflection and/or mutual coupling. To provide a better appreciation of the advantages of the wireless repeaters disclosed herein, a conventional phased-array repeater will now be discussed.

Figure 4:
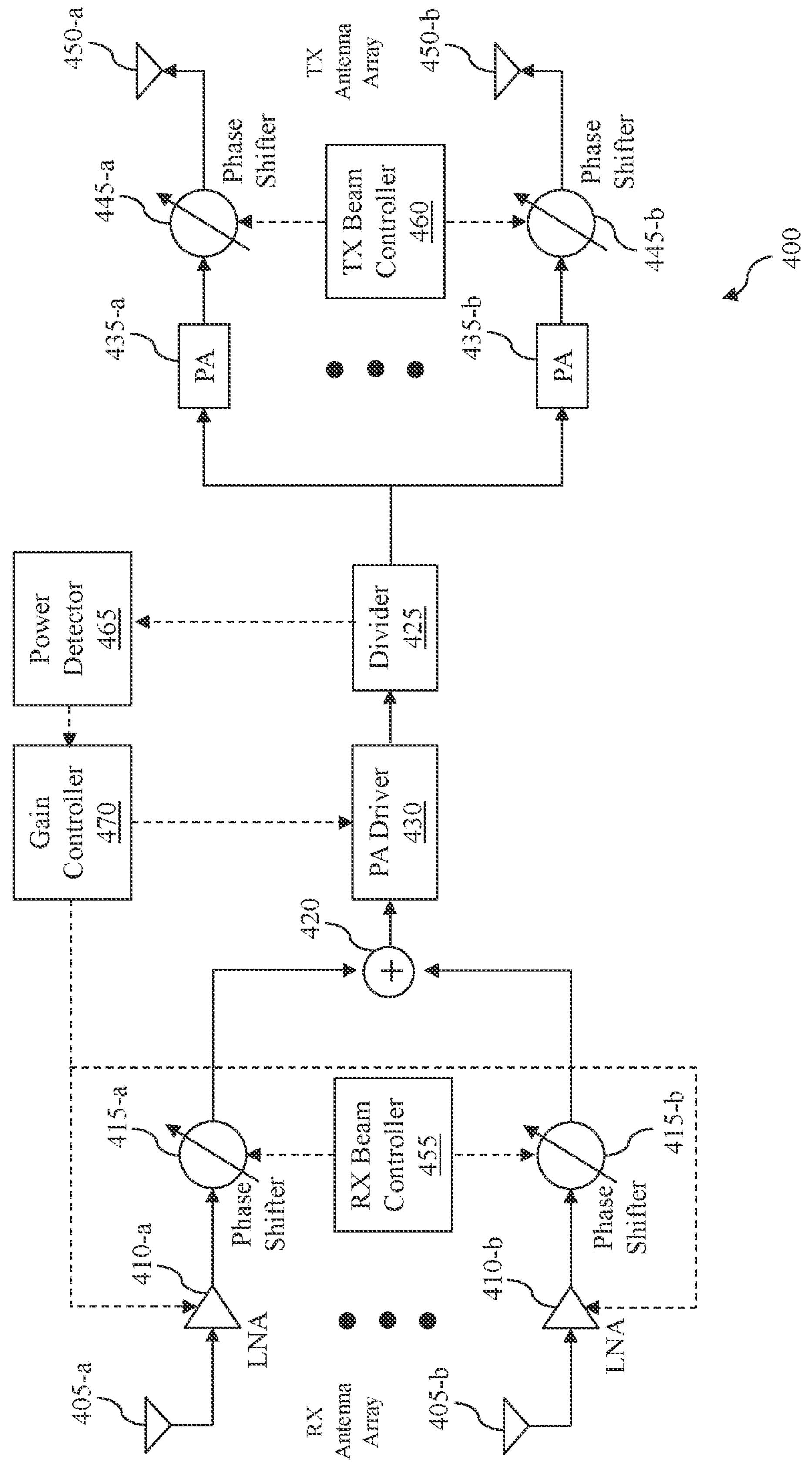
FIG. 4 illustrates a conventional phased-array repeater.

FIG. 4 illustrates a conventional phased-array repeater in accordance with aspects of the present disclosure. A receive antenna array includes a receive antenna 405-*a* and a receive antenna 405-*b*. Each receive antenna associates with an LNA. For example, an LNA 410-*a* amplifies a signal from receive antenna 405-*a*. Similarly, an LNA 410-*b* amplifies a signal from receive antenna 405-*b*. Each LNA also associates with an analog phase-shifter. For example, a phase-shifter 415-*a* phase-shifts an amplified signal from LNA 410-*a*. Similarly, a phase-shifter 415-*b* phase-shifts an amplified signal from LNA 410-*b*. A combiner 420 combines the phase-shifted signals to form a received signal.

The received signal is divided in a divider 425 to drive an array of transmit antennas including a transmit antenna 450-*a* and a transmit antenna 450-*b*. Each transmit antenna associates with a power amplifier for amplifying a corresponding signal from divider 425. For example, a power amplifier 435-*a* amplifies for transmit antenna 450-*a*. Similarly, a power amplifier 435-*b* amplifies for transmit antenna 450-*b*. A phase-shifter for each transmit antenna applies an appropriate phase-shift to the amplified signal from the corresponding power amplifier. For example, a phase-shifter 445-*a* phase-shifts the output signal from power amplifier 435-*a* and drives the corresponding phase-shifted signal to transmit antenna 450-*a*. Similarly, a phase-shifter 445-*b* phase-shifts the output signal from power amplifier 435-*b* and drives the corresponding phase-shifted signal to transmit antenna 450-*b*.

To steer the RX antenna beam (not illustrated) for the receive antenna array, an RX beam controller 455 controls the RX antenna beam direction by controlling phase-shifters 415. Similarly, a TX beam controller 460 steers the TX antenna beam (not illustrated) for the transmit antenna array by controlling phase-shifters 445. A power detector 465 detects the received signal strength to allow a gain controller 470 to control the gains of the LNAs 410. Gain controller 470 also controls the gains of the power amplifiers 435 such as through a power amplifier driver 430.

Although the resulting phased-array repeater may steer the receive and transmit antenna beams, the resulting plurality of LNAs 410, phase-shifters 415, power amplifiers 435, and phase-shifters 445 increases manufacturing cost and complexity and also lowers efficiency. In contrast, the meta-surface repeaters disclosed herein may use as little as one LNA and one PA to provide signal gain. Similarly, the meta-surface repeaters need no analog phase-shifters, which reduces complexity and increases efficiency.

Figure 5:
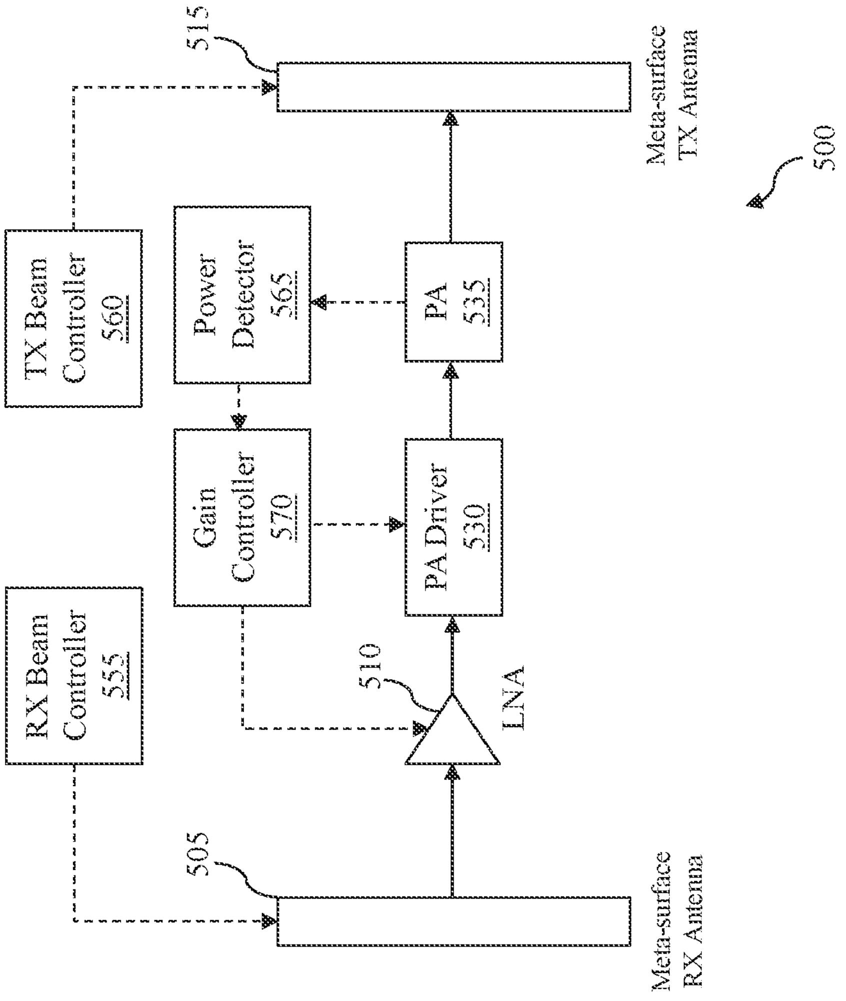
FIG. 5 illustrates an example of a circuit diagram of a beamforming repeater with meta-surface antennas for implementing beamforming.

An example meta-surface repeater 500 is shown in FIG. 5. An LNA 510 amplifies a received signal from a meta-surface RX antenna 505 to produce an amplified received signal. A PA 535 then further amplifies the amplified received signal to form a transmit signal that is transmitted by a meta-surface TX antenna 515. An RX beam controller 555 controls the steering of an RX antenna beam (not illustrated) by meta-surface RX antenna 505. Similarly, a TX beam controller 560 controls the steering of a TX antenna beam (not illustrated) by meta-surface TX antenna 515. A power detector 565 detects the power of the transmit signal amplified by PA 535. Based upon the detected power, a gain controller controls the gain of LNA 510 and also controls the gain of PA 535 by controlling a PA driver 530. The various components such as LNA 510, PA driver 530, PA 535, RX beam controller 555, TX beam controller 560, gain controller 570, and power detector 565 between meta-surface RX antenna 505 and meta-surface TX antenna 515 may be considered to form a signal relay chain and may be implemented as an RF integrated circuit (RFIC).

The meta-surface RX antenna 505 and the meta-surface TX antenna 515 may exhibit negative permittivity and/or permeability, which may yield a negative refractive index. Hence, the meta-surface antennas may produce a lens capability, which may assist in beamforming. The refractive index of the meta-surface antennas 505 and 515 may be electrically tuned for controlling the beam configuration (e.g., width, direction, angle) by the respective controllers 555 and 560. As discussed further with regard to FIG. 7, the meta-surface antennas 505 and 515 may comprise an array of meta-material resonators, which may allow reduced spacing (e.g., less than about ¼ of operational wavelength).

As controlled by RX beam controller 555, the meta-surface RX antenna 505 may receive a signal (e.g., based on beam configuration), which is routed to the LNA 510. Similarly, as controlled by TX beam controller 560, the meta-surface TX antenna 515 may transmit a signal according to a beam configuration. If the antennas 505 and/or 515 include multiple meta-surface antennas configured in an array, the repeater 500 may include a combiner circuit, as described herein to combine pre-processed instances of the signal into a combined signal, and/or a divider circuit to divide the signal to transmit paths corresponding to each meta-surface antenna of the meta-surface antenna array.

The signal relay chain includes the LNA 510, the PA driver 530, and the PA 535. In some implementations, the signal relay chain includes a feedback path including the power detector 565 coupled to a gain controller 570. The power detector 565 receives a signal from the PA 535, and the signal may include the output of the PA 535. Based on the detected output, the gain controller 570 may adjust a gain of the PA driver 530 to the PA 535 and/or the LNA 510 to increase or maintain stability of signal transmission within the signal relay chain. In some implementations, the power detector 565 is optional such that the signal relay chain may not have a feedback path. The gain controller 570 may be configured based on received control information from a remote configuration component (e.g., the remote configuration component 235 in FIG. 2). The meta-surface antennas 505 and 515 may each comprise an array of meta-material resonators, which may allow reduced spacing (e.g., less than about ¼ of operational wavelength). An example repeater with a single meta-surface antenna will now be discussed.

Figure 6:
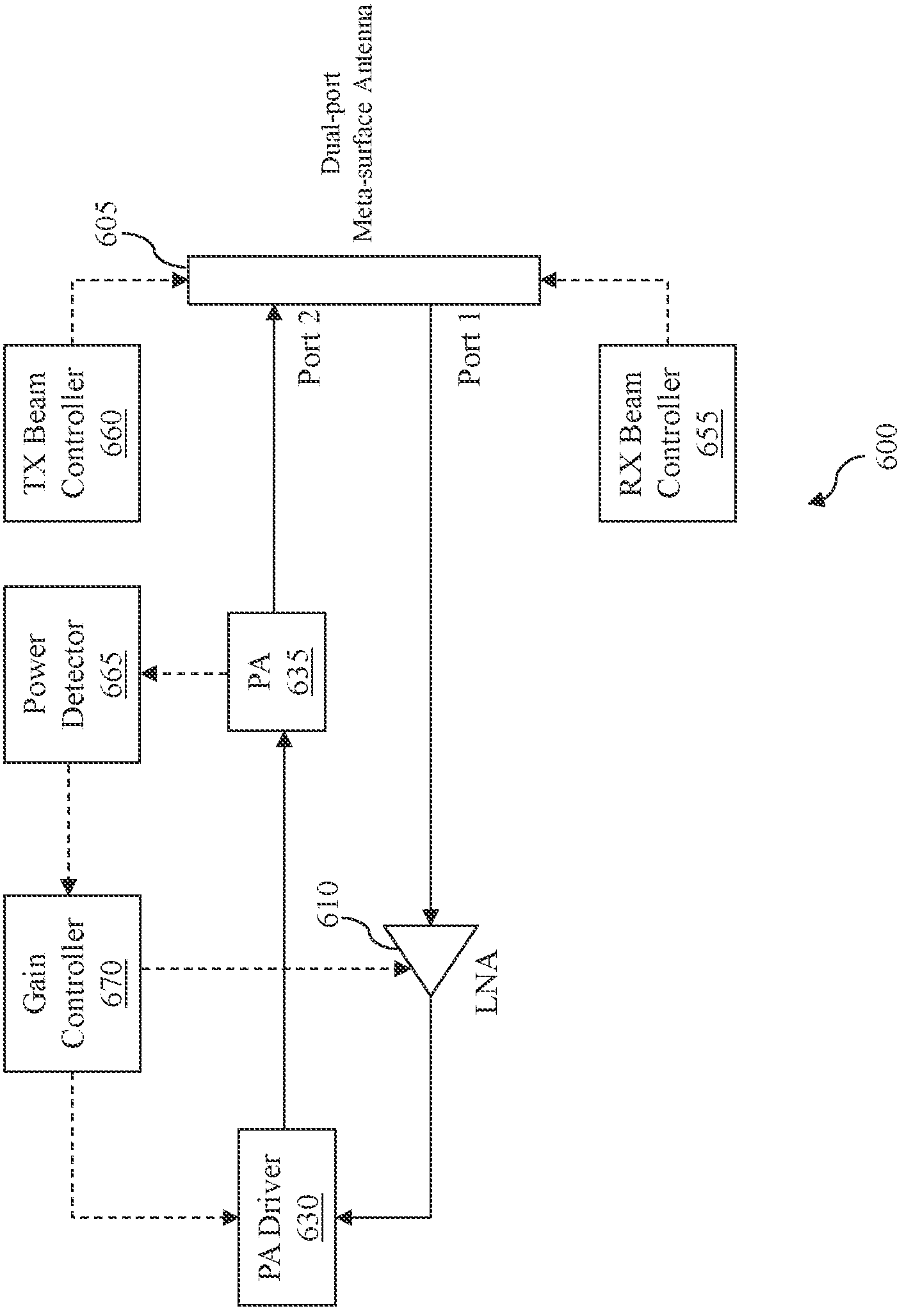
FIG. 6 illustrates an example of a circuit diagram of a beamforming repeater with meta-surface antennas as part of a dual-port meta-surface antenna for implementing beamforming.

FIG. 6 illustrates a beamforming repeater having a single meta-surface antenna 605 that is used for both transmit and receive. Meta-surface antenna 605 includes a reception port 1 for a received signal. An LNA 610 amplifies the received signal from the reception port 1 to produce an amplified receive signal that is amplified by a PA 635 to form a transmit signal. PA 635 drives the transmit signal into a transmission port 2 of meta-surface antenna 605. A PA driver 630 drives PA 635. A power detector 665 detects a power of the transmit signal produced by PA 635. Based upon the detected power (which may also be denoted as a measured power), a gain controller 670 controls the gain of LNA 610 and also a gain of PA 635 (through a control of PA driver 630). The various components, including LNA 610, PA driver 630, PA 635, RX beam controller 655, TX beam controller 660, gain controller 670, and power detector 665 between reception port 1 and transmission port 2 of meta-surface antenna 605 may be denoted as a signal relay chain and may be implemented in an RFIC.

The meta-surface antenna 605 may be a dual-polarized antenna. When the meta-surface antenna 605 functions in a first polarization, the meta-surface antenna 605 may function as a reception antenna with reception port 1, and when the meta-surface antenna 605 functions in a second polarization, the meta-surface antenna 605 may function as a transmission antenna with transmission port 2. Accordingly, meta-surface antenna 605 may be considered to form both a reception antenna and a transmission antenna, dependent on the polarity. It should be understood that the dual-port meta-surface antenna 605 may function in different polarizations simultaneously or contemporaneously. The meta-surface antenna 605 may exhibit negative permittivity and/or permeability, which may yield a negative refractive index. Hence, the meta-surface antenna may produce a lens capability, which may assist in beamforming. The refractive index of the meta-surface antenna 605 may be electrically tuned for controlling the beam configuration (e.g., width, direction, angle) by the respective controllers 655 and 660.

Based on a beam configuration from RX beam controller 655 for the RX antenna beam, the reception port 1 may receive a signal, which is routed to the LNA 610. Similarly, based on beam configuration from TX beam controller 660, the transmission port 2 may transmit a signal in the TX antenna beam.

In some implementations, the signal relay chain includes a feedback path including the power detector 665 coupled to the gain controller 670. Based on the detected power, the gain controller 670 may adjust a gain of the PA driver 630 to the PA 635 and/or the LNA 610 to increase or maintain stability of signal transmission within the signal relay chain. In some cases, the power detector 665 is optional such that the signal relay chain may not have a feedback path. The gain controller 670 may then be configured based on received control information from remote configuration component (e.g., the remote configuration component 235 in FIG. 2).

In contrast to a phase-array repeater, the signal relay chain in the wireless repeaters disclosed herein may include just one LNA, PA driver, and PA. For example, wireless repeater 500 may include merely one LNA 510, one PA driver 530, and one PA 535 between the meta-surface RX antenna 505 and the meta-surface TX antenna 515. Similarly, wireless repeater 600 may include merely one LNA 610, one PA driver 630, and one PA 635 between the ports of the meta-surface antenna 605. Repeaters 500 and 600 may further be free of mixers, filters, analog-to digital or digital-to-analog converters, or phased-lock loop (PLL) synthesizers. Accordingly, a beamforming repeater with meta-surface antennas may achieve lower complexity and lower DC power consumption with a reduced number of LNAs and PAs. In some implementations, with a single LNA and a single PA in the signal relay chain, the feedback path may be more responsive with better real-time gain control performance. Further, unlike the array of antenna elements that is often required for a spacing of half of operational wavelength between antenna elements for beamforming, the meta-surface antenna enjoys a smaller footprint with a reduced spacing (e.g., less than about ¼ of operational wavelength) between meta-material resonators.

Figure 7:
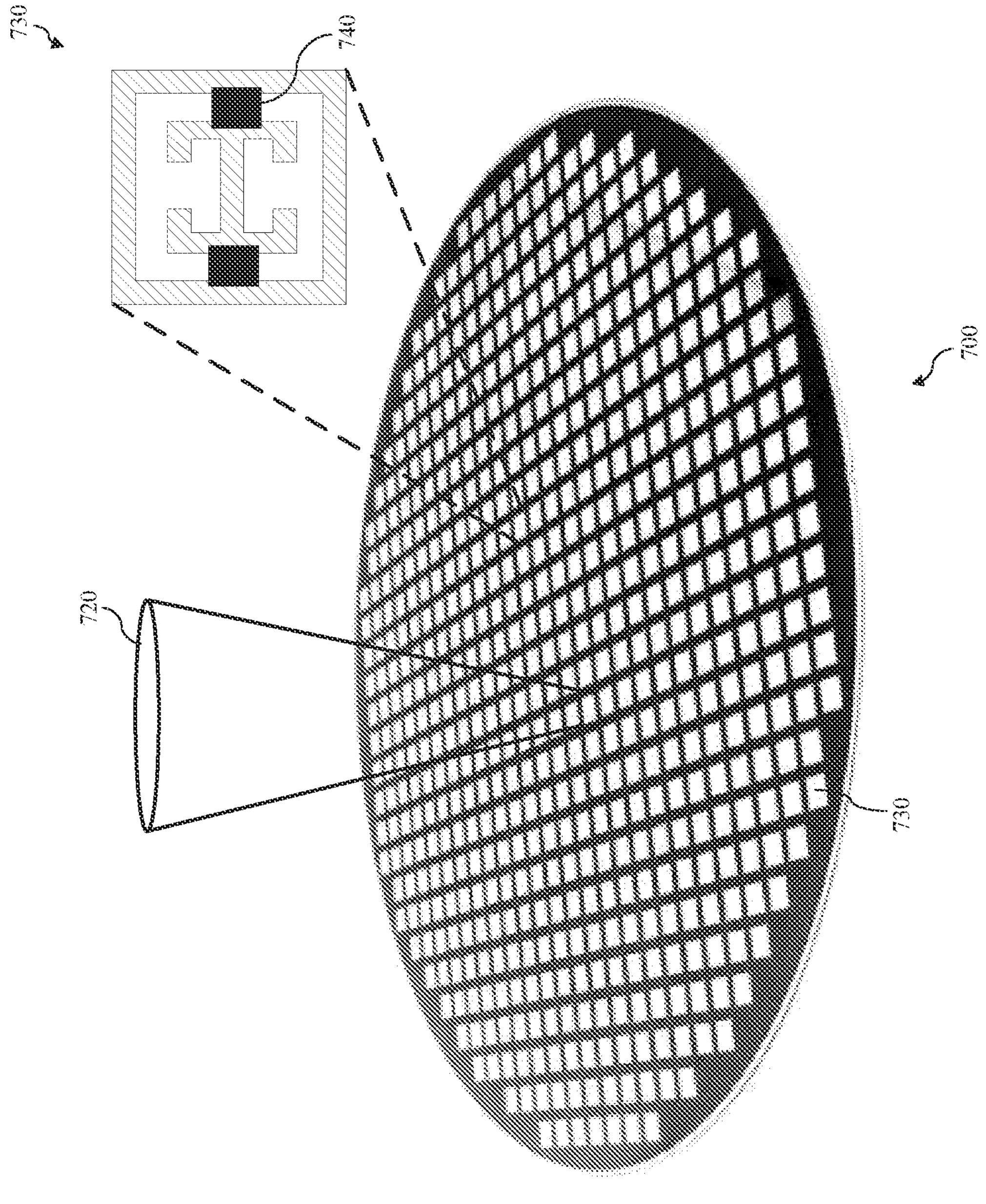
FIG. 7 illustrates an example of a meta-surface antenna and an array of meta-material resonators of the meta-surface antenna.

An example meta-surface antenna 700 for a wireless repeater is shown in FIG. 7. The meta-surface antenna 700 may provide an antenna beam 720 (e.g., a transmit or receive antenna beam) that is configurable in the beam direction and beam width. In some implementations, the meta-surface antenna 700 may be a cavity-backed meta-surface antenna comprising a printed cavity loaded with meta-material resonators 730. In some implementations, the printed cavity may be a double copper-clad dielectric substrate surrounded by metallic walls or via fences, which is also referred to as substrate integrated waveguide (SIW). A SIW may be readily fabricated using commercial, multilayer printed circuit board (PCB) technology. The meta-material resonators 730 are etched into an upper metallic layer (i.e., radiative layer) of the SIW. For transmission, an RF signal is injected into the cavity through coaxial port(s) to form a spatially varying field in the cavity (i.e., feed layer). The feed layer excites the meta-material resonators 730 which couple energy from the waveguide mode into space.

In other implementations, the meta-material resonators 730 may each be a complementary electric-inductive-capacitive (cELC) resonator. The feature size of a single cELC may be less than 1/10 of operational wavelength. Adjacent cELCs are spaced apart for a distance less than about ¼ of operational wavelength. The cELC is used because it behaves electromagnetically as a polarizable magnetic dipole with a resonant polarizability, which can be electronically tuned for beamsteering. Varactors 740 placed across the capacitive gaps between the meta-material and the surrounding waveguide's upper conductor provide a means of tuning the meta-material resonator 730's capacitance, thereby tuning its resonance. In some cases, the main considerations for choosing the varactor are package size and self-resonant frequency. In one example, voltage between 0 and 5V is applied by a bias circuit from the backside of the SIW to change the overall capacitance of the cELC and shifts the resonance of the meta-material resonators 730.

In some implementations, multiple ports can be used to inject signals into the cavity and excite the meta-material resonators 730. Each port is connected to a separate radio unit so that each port acts as a separate input/output while the feed layer and the radiative layer is shared. Here, it is worth noting that the number of meta-material resonators 730 can be different from that of the ports. In a sense the feed layer is acting as a multiplexing device and the radiators are excited with a given amplitude and phase, all encapsulated in a single antenna structure. The operation of the device in receiving signals follows the principle of reciprocity. When an RF signal impinges on the antenna 700, the signal is accepted by the radiative layer and a spatially varying field is formed in the feed layer.

In one example, the meta-surface antenna 700 may be fabricated on a four-layer PCB. The top two layers contain the SIW waveguides and meta-material resonators 730, while the bottom two layers contain control circuitry and components. The varactors 740 may be controlled using, for example, 8-bit, 8 channel digital to analog converters (DACs), which provide an independent bias for each varactor from 0 to 5V. Radial stubs are connected to each control line to decouple the DC and RF signals. The meta-surface antenna 700 may use multiple (e.g., 96) identical meta-material resonators 730 to cover a predetermined radiating area.

Figure 8:
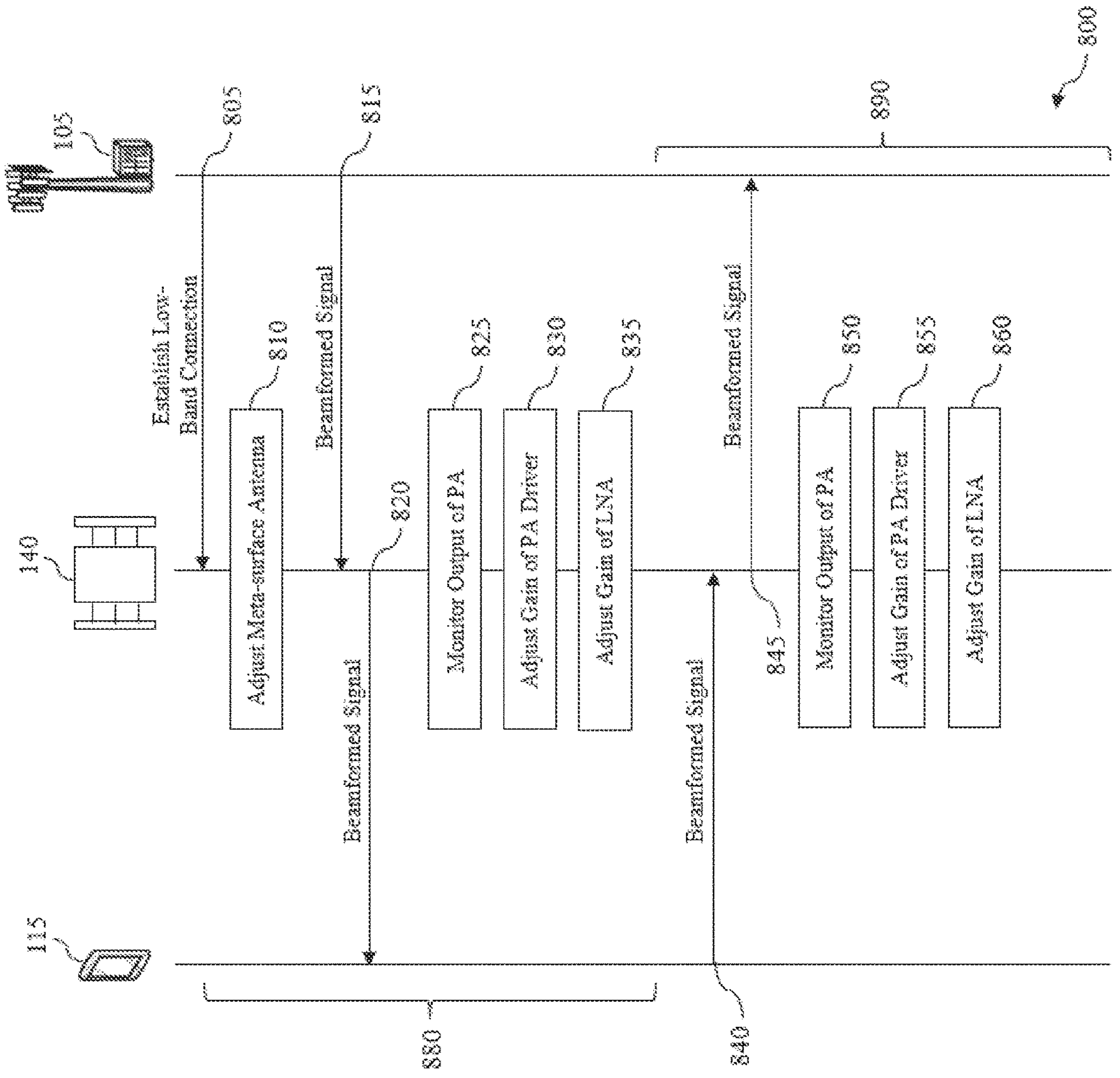
FIG. 8 illustrates an example of a process flow of a beamforming repeater in accordance with aspects of the present disclosure.

FIG. 8 illustrates an example of a process flow 800 for a beamforming repeater with meta-surface antennas (e.g., including a dual-port meta-surface antenna) in accordance with aspects of the present disclosure. In some examples, devices of process flow 800 may implement aspects of wireless communications system 100. The process flow includes a UE 115, a repeater 140, and a base station 105. It should be understood that the features of process flow 800 may be implemented in uplink and downlink scenarios.

At a step 805, the base station 105 and the repeater 140 may optionally establish a low-band connection. In some cases, the low-band connection may be a side connection that may be used to provide control information regarding beamforming to the repeater. Additionally, or alternatively, the low-band connection may provide gain adjustment information. In some cases, the repeater 140 may, additionally or alternatively, establish a low-band connection with UE 115. In some cases, the low-band connection may be a NB-IoT connection using FR1.

At a step 810, the repeater 140 adjusts at least one of the receive antenna beamforming or the transmit antenna beamforming. Not only can this beamforming point or steer the respective antenna beams to the UE/base station, it may also function to reduce signal interference caused by the retransmitting. This beamforming adjustment may be performed by the beam controllers 555, 560, 660, and 655 as described with respect to FIGS. 5-6. As discussed with regard to FIG. 7, a bias DC voltage may be applied to varactors of the meta-material resonators to shift the resonance of the meta-material resonators and accordingly beam direction and/or width of the meta-surface antenna. The beam direction and/or width may be adjusted to avoid the signal interference caused by the retransmitting.

At a step 815, the repeater 140 receives a signal from base station 105. The repeater 140 receives this signal via directional beamforming at a first meta-surface antenna (or at a reception port 1 of a dual-port meta-surface antenna). The receive beamforming may be configured by a beam controller of the repeater 140 or this beamforming may be responsive to a command from base station 105. At a step 820, the repeater 140 retransmits the signal via directional beamforming at a second meta-surface antenna (or at a transmission port 2 of a dual-port meta-surface antenna) to the UE 115. The angle or direction may be configured by a beam controller of the repeater 140. Alternatively, the beamsteering of the transmit antenna beam may be responsive to a command from base station 105.

At a step 825, the repeater 140 monitors an output of at least one PA. The output may be monitored via a feedback path in a signal relay chain of the repeater. At a step 830, the repeater adjusts a gain of a PA driver of the signal relay chain of the repeater based on the output of the PA. At a step 835, the repeater 140 adjusts a gain of one or more LNAs of the signal relay chain of the repeater based on the output of the PA. The gain of the PA driver and/or the gain of the LNAs may be adjusted to maintain or improve signal transmission stability within the repeater, which may result in improved signal quality in the reception beam and/or transmit beam. Steps 805 through 835 may be denoted as a beam adjustment process 880 and may be continuously or periodically repeated based on operational environments. Process 880 may be performed in downlink (e.g., base station 105 to repeater 140 to UE 115) and in uplink (e.g., UE 115 to repeater 140 to base station 105).

At a step 840, the UE 115 transmits a signal to the repeater 140, and the repeater 140 receives the signal from the UE 115 via directional beamforming at the second meta-surface antenna (or through a single meta-surface antenna used for both transmit and receive). At a step 845, the repeater 140 retransmits the UE signal to the base station 105 via the first meta-surface antenna according to directional beamforming (or through a single meta-surface antenna used for both transmit and receive). The repeater 140 again monitors a power of a PA of the repeater 140 at a step 850. The output may be monitored via a feedback path in a signal relay chain of the repeater. At a step 855, the repeater adjusts a gain of a PA driver of the signal relay chain of the repeater based on the detected power and also adjusts a gain of one or more LNAs of the signal relay chain of the repeater based on detected power. The gain of the driver and/or the gain of the LNAs may be adjusted to maintain or improve signal transmission stability within the repeater, which may result in improved signal quality in the reception beam and/or transmit beam. At a step 865, the UE 115 transmits a signal to the repeater 140, and the repeater 140 receives the signal according to one or more receive beams. At 870, the repeater 140 retransmits the signal to the base station 105 via directional beamforming. Steps 840 through 860 may be denoted as an automatic beam adjustment process 890 and may be continuously or periodically repeated based on operational environments. Process 890 may be performed in downlink (e.g., base station 105 to repeater 140 to UE 115) and in uplink (e.g., UE 115 to repeater 140 to base station 105). Processes 880 and 890 may be performed simultaneously or contemporaneously.

Figure 9:
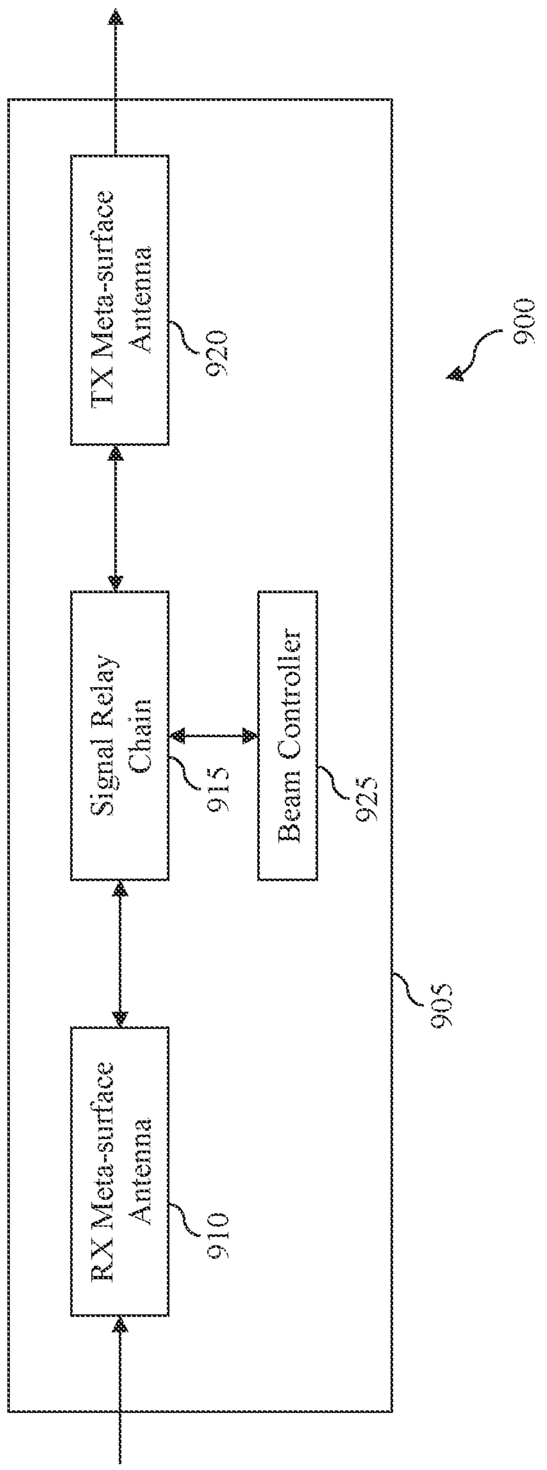
FIG. 9 shows a block diagram of devices that support beamforming repeater in accordance with aspects of the present disclosure.

An example meta-surface antenna RF repeater 900 is summarized in FIG. 9. The device 905 may be an example of aspects of a repeater as described herein. Repeater 900 may include an RX meta-surface antenna 910, a signal relay chain 915, and a TX meta-surface antenna 920. The RX meta-surface antenna 910 and the TX meta-surface antenna 920 may be separate antennas or a single dual-port antenna as discussed earlier.

The RX meta-surface antenna 910 may receive RF signals and these signals may be passed on a signal relay chain 915, which includes RF/microwave components such as LNA and PA. These RF components may be implemented using transistors. Examples of such RF components may include monolithic microwave integrated circuits (MMICs).

Repeater 900 may include a beam controller 925. The beam controller 925 may adjust the scan angle or direction of the beamforming for receiving the signal or retransmitting the signal to increase a signal-to-noise ratio and also to reduce signal interference caused by the retransmitting. In some implementations, the beam controller 925 receives the beamforming configuration through a connection to a network node (e.g., a base station, a UE, or both). In some implementations, the repeater 900 may be configured semi-statically by a cloud-based entity. In some examples, the configuration includes references to a TX and/or RX codebook, where each element in the codebook is associated with a beam pattern and the codebook may be shared between the repeater 900 and the network node. In some implementations, the repeater 900 may be able to change its configuration autonomously, such as by using different sensor information, measurements, and/or AI algorithms. In some cases, the repeater 900 may not include beam controller 925, such that the repeater 900 may use an initial (e.g., fixed) beam configuration and no control interface may be needed.

The meta-surface antenna repeaters disclosed herein have multiple advantageous properties. For example, as compared with a repeater using a phased-array topology, a meta-surface antenna repeater may not require mixers, synthesizers, AD/DA converters, or digital baseband processing, which leads to reduced die size, power, circuit complexity, and cost. The meta-surface antenna repeater may also be suitable for applications with heightened requirements for group delay, such as group delay less than 100 nanoseconds, which mitigates impact on baseband signal error vector magnitude (EVM) at a UE. In addition, a meta-surface antenna repeater may also perform digital echo cancellation of reflected signals such as discussed with regard to meta-surface repeater 300, which improves isolation and thus system stability. Further, the meta-surface antenna repeater may be easily implemented with active gain control via a PA feedback path to maintain loop gain less than 0 dB to maintain system stability. Regarding the beamforming capability of the meta-surface antenna repeater, the RX beamforming helps reduces impact of thermal noise and the TX beamforming reduces a need for an active amplifier. Still further, the metal-surface antenna may be a dual-port cavity-backed meta-surface antenna with separate fields of view for RX and TX, which simplifies antenna design. An example method of operation for a meta-surface antenna repeater will now be discussed.

Figure 10:
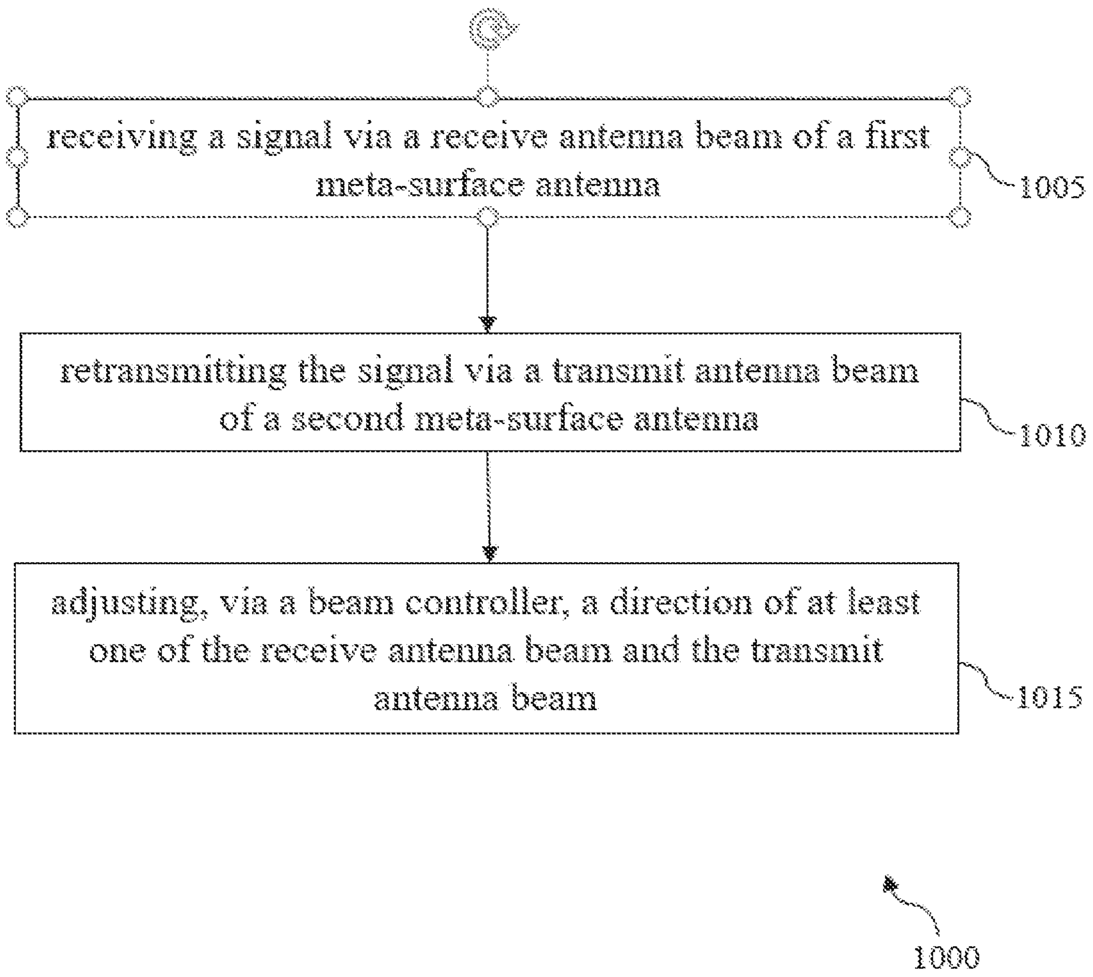
FIGS. 10 and 11 are flowcharts for methods of operation of a beamforming repeater in accordance with aspects of the present disclosure.

FIG. 10 shows a signal relay flow illustrating a method 1000 of operation of a beamforming repeater with meta-surface antenna(s) in accordance with aspects of the present disclosure. An act 1005 includes receiving a signal via a receive antenna beam of a first meta-surface antenna. Receiving a signal via the receive antenna beam may include beamforming the receive antenna beam using one of several possible beam directions and/or beam widths by adjusting a negative refractive index of the meta-surface antenna. In some cases, the adjusting of the negative refractive index includes tuning DC bias voltages applied to the varactors integrated in the meta-surface antenna. In some examples, act 1005 may be performed by a meta-surface antenna as described with reference to FIGS. 5 through 7.

An act 1010 includes retransmitting the signal via a transmit antenna beam of a second meta-surface antenna. Retransmitting the signal via the transmit antenna beam may include beamforming the signal via one of several possible beam directions and/or widths by adjusting a negative refractive index of the meta-surface antenna. In some cases, the adjusting of the negative refractive index includes tuning DC bias voltages applied to the varactors integrated in the meta-surface antenna. Act 1010 may be performed by meta-surface antennas as described with reference to FIGS. 5 through 7.

An act 1015 includes adjusting, via a beam controller, a direction of at least one of the receive antenna beam and the transmit antenna beam. The adjusting may steer the receive antenna beam and/or the transmit antenna beam to increase a signal-to-noise ratio of the signal and also to reduce signal interference caused by the retransmitting. An example of such a signal interference was discussed with regard to the mutual coupling and reflection of FIG. 3.

Figure 11:
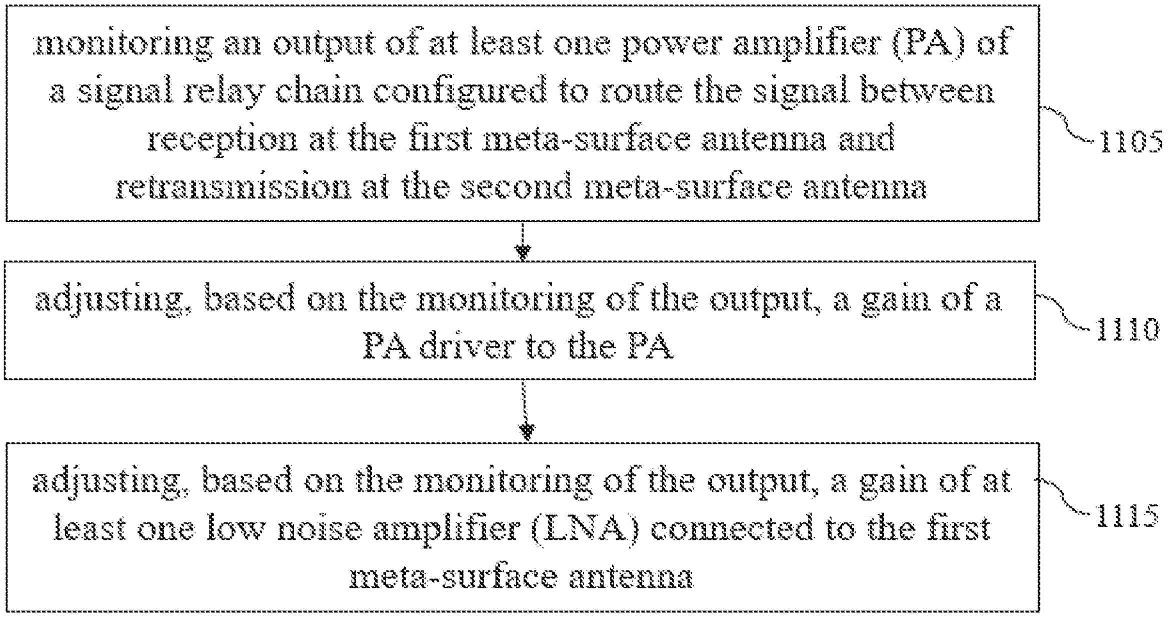

Method 1000 may continue as shown in FIG. 11. An act 1105 includes monitoring an output of at least one power amplifier (PA) of a signal relay chain configured to route the signal between reception at the first meta-surface antenna and retransmission at the second meta-surface antenna. In some examples, act 1105 may be performed by a signal relay chain as described with reference to FIGS. 5 and 6.

An act 1110 includes adjusting, based on the monitoring of the output, a gain of a PA driver to the PA. In some examples, act 1110 may be performed by a signal relay chain as described with reference to FIGS. 5 and 6.

Finally, an act 1115 includes adjusting, based on the monitoring of the output, a gain of at least one low noise amplifier (LNA) connected to the first meta-surface antenna. In some examples, act 1115 may be performed by a signal relay chain as described with reference to FIGS. 5 and 6.

The disclosure will now be summarized in the following example clauses.

Clause 1. An apparatus for wireless communication, comprising:

a first meta-surface antenna configured to receive a signal via a receive antenna beam; a second meta-surface antenna configured to retransmit the signal via a transmit antenna beam; and a signal relay chain connected to route and amplify the signal between a reception at the first meta-surface antenna and a retransmission at the second meta-surface antenna.

Clause 2. The apparatus of clause 1, further comprising: a feedback path for adjusting a gain of the signal relay chain.

Clause 3. The apparatus of clause 2, wherein the signal relay chain comprises a power amplifier (PA) and a PA driver for the PA, and wherein the feedback path includes a power detector for monitoring an output of the PA and a gain controller for adjusting a gain of the PA driver for the PA.

Clause 4. The apparatus of any of clauses 1-2, wherein the signal relay chain comprises a low noise amplifier (LNA) coupled to the first meta-surface antenna, a power amplifier (PA) coupled to the second meta-surface antenna, and a PA driver with an input coupled to the LNA and an output coupled to the PA.

Clause 5. The apparatus of any of clauses 1-4, further comprising: a receive beam controller configured to control the first meta-surface antenna to control a direction of the receive antenna beam; and a transmit beam controller configured to control the second meta-surface antenna to control a direction of the transmit antenna beam.

Clause 6. The apparatus of clause 5, wherein the receive beam controller and the transmit beam controller are each configured to receive beamforming instructions through a side control channel at an operational frequency lower than or the same as that of the signal.

Clause 7. The apparatus of clause 6, wherein the side control channel is based on a narrow-band internet-of-things (NB-IOT) protocol.

Clause 8. The apparatus of any of clauses 1-7, wherein the first meta-surface antenna and the second meta-surface antenna each comprises a cavity-backed meta-surface antenna.

Clause 9. The apparatus of clause 8, wherein each cavity-backed meta-surface antenna includes a substrate integrated waveguide (SIW).

Clause 10. The apparatus of any of clauses 1-7, wherein the first meta-surface antenna and the second meta-surface antenna each comprises an array of meta-material resonators.

Clause 11. The apparatus of clause 10, wherein each of the meta-material resonators is operable as a complementary electric-inductive-capacitive (cELC) resonator.

Clause 12. The apparatus of clause 10, wherein each of the meta-material resonators comprises varactors.

Clause 13. The apparatus of clause 12, wherein each of the varactors is operable to receive an independent DC bias voltage.

Clause 14. The apparatus of any of clauses 1-13, wherein the signal relay chain is configured to maintain the signal at a constant frequency.

Clause 15. The apparatus of any of clauses 1-14, wherein the signal relay chain includes only analog components.

Clause 16. An apparatus for wireless communication, comprising: a dual-port meta-surface antenna with a reception port and a transmission port; and a signal relay chain with an input coupled to the reception port and an output coupled to the transmission port, wherein the signal relay chain is operable to retransmit a signal received from the reception port to the transmission port.

Clause 17. The apparatus of clause 16, wherein the dual-port meta-surface antenna is operable to provide directional beamforming.

Clause 18. The apparatus of any of clauses 16-17, wherein the dual-port meta-surface antenna is configured to receive according to a first polarization at the reception port and to transmit at the transmission port with a second polarization, and wherein the first polarization is different from the second polarization.

Clause 19. The apparatus of any of clause 16-18, wherein the signal relay chain includes a low noise amplifier (LNA) with an input coupled to the reception port, a power amplifier (PA) driver coupled to an output of the LNA, and a PA with an input coupled to the PA driver and an output coupled to the transmission port.

Clause 20. The apparatus of any of clauses 16-19, further comprising: a beam controller to adjust a directional beamforming of the dual-port meta-surface antenna.

Clause 21. The apparatus of clause 20, wherein the beam controller is configured to adjust the directional beamforming by tuning a negative refractive index of the dual-port meta-surface antenna.

Clause 22. The apparatus of clause 20, wherein the beam controller is configured to adjust the directional beamforming by adjusting DC bias voltages to varactors integrated in the dual-port meta-surface antenna.

Clause 23. The apparatus of any of clauses 16-22, further comprising: a feedback path for adjusting a gain provided by the signal relay chain between the reception port and the transmission port.

Clause 24. A method for wireless communication, comprising: receiving a signal through a receive antenna beam of a first meta-surface antenna; retransmitting the signal through a transmit antenna beam of a second meta-surface antenna; and adjusting, via a beam controller, a direction of at least one of the receive antenna beam and the transmit beam.

Clause 25. The method of clause 24, further comprising: receiving a beamforming configuration, wherein the beam controller is operable to adjust the direction of at least one of the receive antenna beam the transmit antenna beam responsive to the beamforming configuration.

Clause 26. The method of any of clauses 24-25, further comprising: transmitting a codebook of beam patterns for the first meta-surface antenna and for the second meta-surface antenna to a control entity.

Clause 27. The method of any of clauses 24-26, further comprising: monitoring an output of at least one power amplifier (PA) of a signal relay chain connected to route the signal between reception at the first meta-surface antenna and retransmission at the second meta-surface antenna; and adjusting, based at least in part on the monitoring of the output, a gain of a PA driver to the PA.

Clause 28. The method of clause 27, further comprising: adjusting, based at least in part on the monitoring of the output, a gain of at least one low noise amplifier (LNA) coupled to the first meta-surface antenna.

Clause 29. An apparatus for wireless communication, comprising: means for receiving, at a first meta-surface antenna of a wireless repeater, a signal via directional beamforming; means for retransmitting the signal via directional beamforming at a second meta-surface antenna of the wireless repeater; and means for adjusting, via a beam controller, at least one of the directional beamforming for receiving the signal or retransmitting the signal in order to reduce signal interference caused by the retransmitting.

Clause 30. The apparatus of clause 29, further comprising: means for routing and amplifying the signal between reception at the first meta-surface antenna and retransmission at the second meta-surface antenna.

It should be noted that the methods described herein describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described examples. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:

a first meta-surface antenna, comprising a set of receiver phase-shifters, configured to receive a signal via a receive antenna beam;

a second meta-surface antenna, comprising a set of transmit phase-shifters, configured to retransmit the signal via a transmit antenna beam;

a beam controller, configured to receive a beamforming configuration and adjust a direction of at least one of the receive antenna beam or the transmit antenna beam based at least in part on the beamforming configuration; and a signal relay chain connected to route and amplify the signal between a reception at the first meta-surface antenna and a retransmission at the second meta-surface antenna, wherein the signal relay chain is unidirectional.

2. The apparatus of claim 1, further comprising: a feedback path for adjusting a gain of the signal relay chain.

3. The apparatus of claim 2, wherein the signal relay chain comprises a power amplifier (PA) and a PA driver for the PA, and wherein the feedback path includes a power detector for monitoring an output of the PA and a gain controller for adjusting a gain of the PA driver for the PA.

4. The apparatus of claim 1, wherein the signal relay chain comprises a low noise amplifier (LNA) coupled to the first meta-surface antenna, a power amplifier (PA) coupled to the second meta-surface antenna, and a PA driver with an input coupled to the LNA and an output coupled to the PA.

5. The apparatus of claim 1, further comprising: a receive beam controller configured to control the first meta-surface antenna to control a direction of the receive antenna beam; and a transmit beam controller configured to control the second meta-surface antenna to control a direction of the transmit antenna beam.

6. The apparatus of claim 5, wherein the receive beam controller and the transmit beam controller are each configured to receive beamforming instructions through a side control channel at an operational frequency lower than or the same as that of the signal.

7. The apparatus of claim 6, wherein the side control channel is based on a narrow-band internet-of-things (NB-IOT) protocol.

8. The apparatus of claim 1, wherein the first meta-surface antenna and the second meta-surface antenna each comprises a cavity-backed meta-surface antenna.

9. The apparatus of claim 8, wherein each cavity-backed meta-surface antenna includes a substrate integrated waveguide (SIW).

10. The apparatus of claim 1, wherein the first meta-surface antenna and the second meta-surface antenna each comprises an array of meta-material resonators.

11. The apparatus of claim 10, wherein each of the meta-material resonators is operable as a complementary electric-inductive-capacitive (cELC) resonator.

12. The apparatus of claim 10, wherein each of the meta-material resonators comprises varactors.

13. The apparatus of claim 12, wherein each of the varactors is operable to receive an independent DC bias voltage.

14. The apparatus of claim 1, wherein the signal relay chain is configured to maintain the signal at a constant frequency.

15. The apparatus of claim 1, wherein the signal relay chain includes only analog components.

16. The apparatus of claim 1, wherein each of the first meta-surface antenna and the second meta-surface antenna comprises a plurality of resonators, and each of the resonators includes capacitive gaps and two varactors placed across the capacitive gaps.

17. An apparatus for wireless communication, comprising:

a dual-port meta-surface antenna with a reception port and a transmission port;

a beam controller, configured to receive a beamforming configuration and adjust a direction of at least one of the dual-port meta-surface antenna based at least in part on the beamforming configuration; and a signal relay chain with an input coupled to the reception port and an output coupled to the transmission port, wherein the signal relay chain is unidirectional and operable to retransmit, via the dual-port meta-surface antenna, comprising a set of phase-shifters, a signal received from the reception port to the transmission port.

18. The apparatus of claim 17, wherein the dual-port meta-surface antenna is operable to provide directional beamforming.

19. The apparatus of claim 17, wherein the dual-port meta-surface antenna is configured to receive according to a first polarization at the reception port and to transmit at the transmission port with a second polarization, and wherein the first polarization is different from the second polarization.

20. The apparatus of claim 17, wherein the signal relay chain includes a low noise amplifier (LNA) with an input coupled to the reception port, a power amplifier (PA) driver coupled to an output of the LNA, and a PA with an input coupled to the PA driver and an output coupled to the transmission port.

21. The apparatus of claim 17, further comprising: a beam controller to adjust a directional beamforming of the dual-port meta-surface antenna.

22. The apparatus of claim 21, wherein the beam controller is configured to adjust the directional beamforming by tuning a negative refractive index of the dual-port meta-surface antenna.

23. The apparatus of claim 21, wherein the beam controller is configured to adjust the directional beamforming by adjusting DC bias voltages to varactors integrated in the dual-port meta-surface antenna.

24. The apparatus of claim 17, further comprising: a feedback path for adjusting a gain provided by the signal relay chain between the reception port and the transmission port.

25. A method for wireless communication, comprising:

receiving a beamforming configuration;

receiving a signal via a receive antenna beam of a first meta-surface antenna, comprising a set of receiver phase-shifters;

routing and amplifying the signal through a signal relay chain coupled between the first meta-surface antenna and a second meta-surface antenna, comprising a set of transmit phase-shifters, the signal relay chain being unidirectional;

retransmitting the signal via a transmit antenna beam of the second meta-surface antenna; and adjusting, via a beam controller, a direction of at least one of the receive antenna beam and the transmit antenna beam, based at least in part on the beamforming configuration.

26. The method of claim 25, wherein the beam controller is operable to adjust the direction of the receive antenna beam and the transmit antenna beam based at least in part on the beamforming configuration.

27. The method of claim 25, further comprising: transmitting a codebook of beam patterns for the first meta-surface antenna and for the second meta-surface antenna to a control entity.

28. The method of claim 25, further comprising: monitoring an output of at least one power amplifier (PA) of a signal relay chain connected to route the signal between the first meta-surface antenna and the second meta-surface antenna; and adjusting, based at least in part on the monitoring of the output, a gain of a PA driver to the PA.

29. The method of claim 28, further comprising: adjusting, based at least in part on the monitoring of the output, a gain of at least one low noise amplifier (LNA) coupled to the first meta-surface antenna.

30. An apparatus for wireless communication, comprising:

means for receiving a beamforming configuration;

means for receiving, at a first meta-surface antenna, comprising a set of receiver phase-shifters, of a wireless repeater, a signal via directional beamforming;

means for retransmitting the signal via directional beamforming at a second meta-surface antenna, comprising a set of transmit phase-shifters, of the wireless repeater;

means for routing and amplifying the signal through a signal relay chain coupled between reception at the first meta-surface antenna and retransmission at the second meta-surface antenna, the signal relay chain being unidirectional; and means for adjusting, via a beam controller, at least one of the directional beamforming for receiving the signal or retransmitting the signal in order to reduce signal interference caused by the retransmitting, based at least in part on the beamforming configuration.

* * * * *